Patented Aug. 22, 1950

2,519,754

UNITED STATES PATENT OFFICE 2,519,754

MANUFACTURE OF ETHYLENE GLYCOL ESTERS

William F. Gresham and Carl E. Schweitzer, Wilmington, Del., assignors to E. I. du Pont de Nemours & Company, Wilmington, Del., a corporation of Delaware No Drawing. Application September 8, 1947, Serial No. 772,900

4 Claims. (Cl. 260—497)

This invention relates to a process for the preparation of ethylene glycol diacetate and more particularly to the preparation of the ester by the oxidation of ethylene in the presence of acetic acid.

It is an object of the present invention to provide a process for the simultaneous oxidation and reaction of ethylene with acetic acid. Another object is to provide a process for the controlled oxidation in the liquid phase of ethylene with acetic acid in the presence of a halogen acid and especially hydrobromic acid as the catalyst. A further object is to provide an improved process for the preparation of ethylene glycol diacetate in superior yields. Other objects and advantages of the invention will be apparent by reference to the following specification.

In accord with the invention it has been found that a mixture of ethylene, acetic acid and a halogen acid can be oxidized to ethylene glycol diacetate, the reaction being accomplished by subjecting the mixture to oxidation by means of an oxygen-containing gas, for example, oxygen or air, or air enriched with oxygen, the reaction taking place during the bubbling of the oxidizing gas into the mixture or the bubbling via separate streams of the ethylene and oxidizing gas into the mixture. Various proportions of the ethylene and acetic acid may be employed, based upon their weight percent, but the ratio of about three mols of ethylene per mol of acetic acid is the preferred ratio, although this ratio may range from two to four parts by weight of acetic acid per part of ethylene.

While the process may be carried out at temperatures ranging from 100° C. upward to about 250° C., generally speaking the use of temperatures in the more restricted range of between 180° C. to 220° C., tends to give, other conditions remaining the same, higher proportions of the useful products. It has also been found that pressures aid in furthering the reaction and should be used to the extent of from 400 to 1500 pounds per square inch with a preferred range between 800 and 900 pounds per square inch.

The yields of the diester are markedly increased if a suitable catalyst is employed. For this purpose catalysts comprising hydrohalide acids or organic halides capable of generating the free acids are superior to other catalysts. While the iodides and chlorides are good catalysts for the reaction, the most outstanding results are provided with the use of hydrobromic acid or aliphatic bromides such as methyl, ethyl, propyl, and butyl bromide, ethylene dibromide and other aliphatic bromides which are capable of generating free hydrobromic acid under reaction conditions. In as much as bromine will combine with ethylene to form ethylene dibromide it is obvious that the addition of bromine to the ethylene is in effect the same as the addition of ethylene dibromide. The hydrogen halides or organic halides, and more particularly hydrobromic acid and the aliphatic bromides are used to the extent of 0.05 to 0.5% catalyst based on the weight of acetic acid used.

As a further feature of the invention we have found that, especially when operating at the lower temperatures, say 150° C. or below, the yields and efficiency of the process may be even further improved by carrying on the oxidation, whether with or without the solvents referred to, in the presence of one or more "initiators," which term we employ herein to designate substances capable of initiating attack on the hydrocarbon molecule which may itself not readily react with molecular oxygen under my preferred low temperature conditions. For example, there may be employed organic peroxides, such as sodium and hydrogen peroxide; peracids, such as peracetic and perbenzoic acids; the aldehydes, such as acetaldehyde, propionaldehyde, and isobutyraldehyde; ketones, such as acetone, methyl ethyl ketone, diethyl ketone, and cyclohexanone; ether, such as diisopropyl, diethyl and diamyl ethers; olefines such as cyclohexene and octylene.

The ratio of air or other oxidizing gas to ethylene employed may vary over a wide range although from 20 to 40 volume percent air may be employed advantageously with a preferred range between 25 and 35 volume percent.

The examples illustrate the preferred embodiments of the invention in which parts are by weight unless otherwise indicated.

*Example 1.*—A solution of 500 grams acetic acid 0.6 gram of hydrobromic acid, and 0.5 grams each of methyl ethyl ketone and propionaldehyde was charged into a tantalum lined converter of about 1200 cc. capacity, provided with suitably valved gas outlet and inlet lines at top and bottom, respectively. A gaseous mixture, containing on a volume basis 75 percent ethylene and 25 percent air, was bubbled from the bottom to the top of the acetic acid, the mixture being maintained at a temperature between 215° and 219° C., and under pressure of about 900 lb. per sq. in. The once through conversion was about 1.2 percent to ethylene glycol diacetate with a small amount of reaction residues.

*Example 2.*—The process of Example 1 was repeated using ethylene dibromide as the catalyst to the extent of about 1 percent of the acetic acid. The reaction in this instance was conducted at a temperature between 198° and 220° C. under pressure of 900 lb. per sq. in. and about 0.2 percent methyl ethyl ketone and propionaldehyde (50:50 weight ratio) was employed as initiators for the reaction. The once through conversion to ethylene glycol diacetate was approximately 1.7 percent.

*Example 3.*—The process of Example 1 was repeated, with about 1 percent normal butyl bromide based on the acetic acid as the catalyst, being conducted at a temperature between 216° and 220° C. under pressure of about 900 lb. per sq. in. In this reaction about 1.3 percent conversion was attained per pass.

*Example 4.*—The process of Example 1 was repeated employing hydrochloric acid as the catalyst to the extent of about 1 percent. The reaction was conducted at a temperature between 200° and 210° C. and under a pressure of 900 lb. per sq. in. While in this instance once through conversion was approximately 1.7 percent, large amounts of reaction residues were obtained which lowered the value of this catalyst when compared with the catalysts described in the other examples.

Although specific disclosures have been made in the examples of methods for carrying out the invention in accord with the batch process, nevertheless it should be understood that the invention may also be practiced in accord with a continuous process. Thus, after completion of the reaction which may be accomplished by passing the ethylene, acetic acid, oxygen and catalyst through a catalyst zone of considerable length relative to diameter the unreacted ethylene and oxygen are separated and recycled and the ethylene glycol diacetate recovered in a purified form by fractional distillation. The unreacted ethylene and oxygen, as an unexplosive mixture, diluted or not with an inert gas such as nitrogen is, for economical operation, recycled after the introduction of make-up ethylene and oxygen. By operation in accord with such a continuous process ethylene recovery problems are avoided.

While the process described in the examples involves passage of the oxidizing gas through a body of liquid, it will be understood that other means of assuring the desired liquid-gas contact may be employed as, for example, passage of liquid and gas concurrently or counter-currently through a tube or tower, which may be supplied with plates, packing, or other devices for enhancing gas-liquid contact.

We claim:

1. A process for the preparation of ethylene glycol diacetate which comprises acting on acetic acid and ethylene with an oxidizing gas at a temperature between 100° and 250° C. and in the presence of a catalyst selected from the group consisting of hydrobromic acid and aliphatic organic bromides capable of generating the free hydrobromic acid at temperatures between 100° and 250° C. and under oxidizing conditions.

2. The process of claim 1 conducted at a temperature between 180° and 200° C.

3. The process of claim 1 conducted at a temperature between 180° and 220° C. and under a pressure between 400 and 1500 pounds per sq. in.

4. A process for the preparation of ethylene glycol diacetate which comprises acting on a mixture of ethylene and acetic acid in the presence of hydrobromic acid with molecular oxygen under a temperature between 100 and 250° C. and under a pressure between 400 and 1500 pounds per square inch.

WILLIAM F. GRESHAM.
CARL E. SCHWEITZER.

REFERENCES CITED

The following references are of record in the file of this patent:

UNITED STATES PATENTS

| Number | Name | Date |
| --- | --- | --- |
| 1,790,521 | Davis | Jan. 27, 1931 |
| 1,898,627 | Hoffman | Feb. 21, 1933 |
| 2,138,917 | Grun | Dec. 6, 1938 |